US012424759B2

(12) United States Patent
Owens

(10) Patent No.: US 12,424,759 B2
(45) Date of Patent: Sep. 23, 2025

(54) AUTOMATICALLY TUNING ULTRA-WIDEBAND ANTENNA

(71) Applicant: Skywave Antennas, Inc., Huntsville, AL (US)

(72) Inventor: Roger Owens, Huntsville, AL (US)

(73) Assignee: Skywave Antennas, Inc., Huntsville, AL (US)

( * ) Notice: Subject to any disclaimer, the term of this patent is extended or adjusted under 35 U.S.C. 154(b) by 105 days.

(21) Appl. No.: 18/540,432

(22) Filed: Dec. 14, 2023

(65) Prior Publication Data

US 2024/0113439 A1 Apr. 4, 2024

Related U.S. Application Data

(63) Continuation of application No. 17/098,125, filed on Nov. 13, 2020, now abandoned.

(60) Provisional application No. 62/934,801, filed on Nov. 13, 2019.

(51) Int. Cl.

| | |
|---|---|
| ***H01Q 13/08*** | (2006.01) |
| ***H01Q 1/04*** | (2006.01) |
| ***H01Q 1/22*** | (2006.01) |
| ***H01Q 5/25*** | (2015.01) |
| ***H01Q 9/22*** | (2006.01) |
| ***H01Q 9/30*** | (2006.01) |

(52) U.S. Cl.

CPC ............... *H01Q 13/08* (2013.01); *H01Q 1/04* (2013.01); *H01Q 1/2233* (2013.01); *H01Q 5/25* (2015.01); *H01Q 9/30* (2013.01); *H01Q 9/22* (2013.01)

(58) Field of Classification Search

CPC .......... H01Q 1/04; H01Q 1/2233; H01Q 9/22; H01Q 9/30; H01Q 13/08

See application file for complete search history.

(56) References Cited

U.S. PATENT DOCUMENTS 2,531,476 A * 11/1950 Schriefer ................. H01Q 9/40 343/831
5,592,183 A * 1/1997 Henf ......................... H01Q 9/22 343/749
5,621,420 A * 4/1997 Benson .................... H01Q 9/30 343/790
5,926,149 A * 7/1999 Rummeli ............... H01Q 5/371 343/749
6,081,236 A * 6/2000 Aoki ...................... H01Q 1/245 343/702

(Continued)

*Primary Examiner* — Ab Salam Alkassim, Jr.

(74) *Attorney, Agent, or Firm* — Angela Holt; Bradley Arant Boult Cummings LLP

(57) ABSTRACT

A method for propagating signals with an automatically-tuning antenna uses an ultra-wideband antenna formed from a coaxial cable passed through the center of a conductive tube. The center conductor of the coaxial cable is connected to an end of the conductive tube, and the shield of the coaxial cable is not electrically connected to any conductor. Two ferrite beads are disposed serially on the cable beneath the tube, spaced apart from the tube and spaced apart from one another. A centering spacer maintains the coaxial cable within the center of the tube. An electrical signal is applied to a proximal end of the coaxial tube. The antenna is automatically tuned as the frequency of the electrical signal changes, without a need to reconfigure the physical components of the antenna.

19 Claims, 5 Drawing Sheets

(56) References Cited

U.S. PATENT DOCUMENTS

| | | | | |
|---|---|---|---|---|
| 6,963,313 | B2 * | 11/2005 | Du | H01Q 9/32<br>343/792 |
| 7,164,389 | B1 * | 1/2007 | Platt | H01Q 9/30<br>343/792 |
| 2011/0001685 | A1 * | 1/2011 | Yukimoto | H01Q 1/242<br>343/905 |
| 2012/0319914 | A1 * | 12/2012 | Sakuma | H01Q 9/22<br>343/790 |
| 2014/0247193 | A1 * | 9/2014 | Parsche | H01Q 5/321<br>343/791 |
| 2016/0197408 | A1 * | 7/2016 | Kilian | H01Q 1/2216<br>343/793 |
| 2019/0260130 | A1 * | 8/2019 | Webb | H01Q 9/0421 |
| 2019/0288396 | A1 * | 9/2019 | West | H01Q 13/08 |

* cited by examiner

AUTOMATICALLY TUNING ULTRA-WIDEBAND ANTENNA

REFERENCE TO RELATED APPLICATIONS

This application is a continuation of U.S. Non-Provisional patent application Ser. No. 17/098,125, titled "Ultra Wide-band Antenna," which claims priority to U.S. Provisional Patent Application No. 62/934,801, titled "1P Antenna." Both applications are incorporated herein by reference.

BACKGROUND AND SUMMARY

A method for propagating signals with an automatically-tuning antenna uses an ultra-wideband antenna formed from a coaxial cable passed through the center of a conductive tube. The center conductor of the coaxial cable is connected to an end of the conductive tube, and the shield of the coaxial cable is not electrically connected to any conductor. Two ferrite beads are disposed serially on the cable beneath the tube, spaced apart from the tube and spaced apart from one another. A centering spacer maintains the coaxial cable within the center of the tube. An electrical signal is applied to a proximal end of the coaxial tube. The antenna is automatically tuned as the frequency of the electrical signal changes, without a need to reconfigure the physical components of the antenna.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
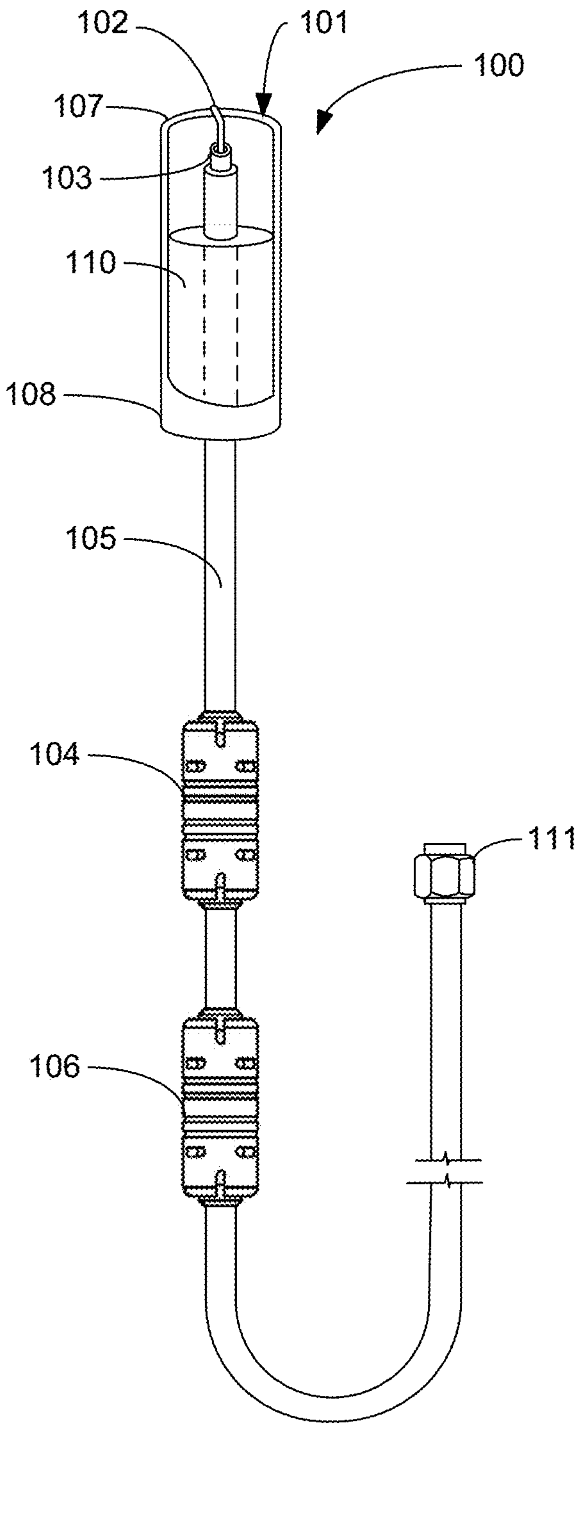
FIG. 1 depicts an antenna according to an exemplary embodiment of the present disclosure.

FIG. 1 depicts an antenna 100 according to an embodiment of the present disclosure. The antenna 100 comprises a coaxial cable 105 extending through a tube 101. The tube 101 is a thin, conductive, cylindrical tube, formed from brass in the illustrated embodiment. (The tube 101 as illustrated is partially cut-away to show the coaxial cable 105 within the tube 101.) In one embodiment, the tube 101 has an outside diameter of 0.75 inches and is 42.6 millimeters long. The wall of the tube is between 0.38 mm and 0.420 mm thick in one embodiment.

The tube 101 has a distal end 107 and a proximal end 108. A center wire 102 of the coaxial cable 105 is electrically connected to the tube 101. A shield 103 of the coaxial cable 105 terminates below distal end 107 of the tube 101 in the illustrated embodiment and is not electrically connected to any conductor at the distal end of the cable 105. In one embodiment, the coaxial shield 103 terminates ¼ inches below distal end 107 of the tube 101. In one embodiment, the coaxial shield 103 terminates between 6.1 mm and 6.6 mm from the distal end 107 of the tube 101. In one embodiment, a dielectric insulator (not shown) of the coaxial cable extends above the shield 103 of the coaxial cable 105 and terminates before the center wire 102 is connected to the tube 101.

The coaxial cable 105 is substantially centered within the tube 101. A centering spacer 110 keeps the coaxial cable 105 centered within the tube 101 for substantially the length of the tube 101. At the distal end 107 of the tube, the center wire 102 is bent and electrically connected to the tube 101. The centering spacer 110 is formed from an insulating material. In one embodiment, the centering spacer 110 is formed from polyurethane foam.

A first ferrite bead 104 and a second ferrite bead 106 are disposed on the cable 105 beneath the proximal end 108 of the tube 101. The ferrite beads 104 and 106 extend around the shield 103 of the cable 105. In one embodiment, the first ferrite bead 104 is spaced from the proximal end 108 of the tube 101 a distance of between 84.8 mm and 87.6 mm. In one embodiment, the second ferrite bead 106 is spaced from the first ferrite bead 104 a distance of between 59 mm and 61 mm. The spacing of the first and second ferrite beads 104 and 106 is designed to affect the resonant point of the antenna 100. A connector 111 at the end of the cable 105 connects the antenna 100 into a system (not shown).

Figure 2:
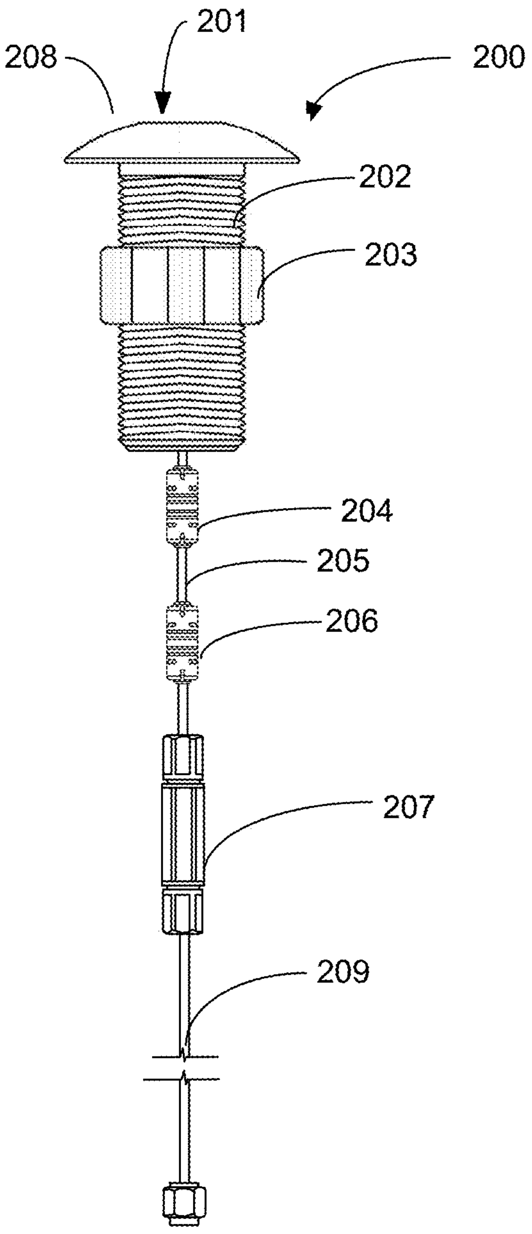
FIG. 2 depicts an antenna for use in underground pits.

FIG. 2 depicts an antenna 200 according to an embodiment of the present disclosure. The antenna 200 comprises a mushroom-shaped housing 201 configured to be used in underground pits, such as a water meter pit. The housing 201 is formed from a nylon composite material in the illustrated embodiment. The housing 201 comprises a rounded top portion 208 unitarily formed with a threaded portion 202. The threaded portion 202 is substantially cylindrical with continuous threads along an outer surface for receiving a threaded nut 203. The rounded top portion 208 is circular when viewed from the top and extends outwardly from the threaded portion 202. The threaded portion 202 may be fit within an opening (not shown) on a cover (not shown) of a water meter (not shown), for example, and the rounded top portion 208 is larger than the opening and the threaded portion and thus remains above the top of the cover and above ground when installed. The threaded nut 203 secures the antenna 200 to the cover. The antenna 200 can operate when installed in either metal or composite covers.

A coaxial cable 205 extends downwardly from a bottom of the housing 201 as shown. A first ferrite bead 204 and a second ferrite bead 206 are disposed on the cable 205 beneath the housing 201. The ferrite beads 204 and 206 are substantially the same as the ferrite beads 104 and 106 discussed above with respect to FIG. 1. The housing 201 houses the tube 101 discussed above, and the coaxial cable 205 is substantially the same as the coaxial cable 105 discussed above.

A waterproof connector 207 is disposed on the cable 205 beneath the second ferrite bead 206. Additional cable length 209 extends on the other side of the connector 207.

Figure 3:
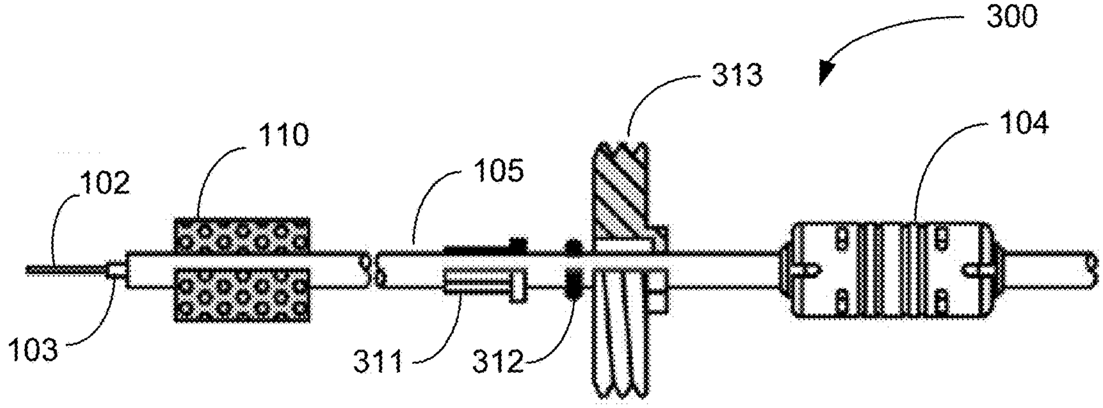
FIG. 3 is a partially cut-away view of a partial antenna assembly according to the embodiment of the present disclosure discussed above with respect to FIG. 1.

FIG. 3 is a partially cut-away view of a partial antenna assembly 300 according to the embodiment of the present disclosure discussed above with respect to FIG. 1. In this partial assembly 300, the centering spacer 110 has been installed on the coaxial cable 105. A threaded flange 313 is disposed on the cable 105 between the distal end of the cable 105 and the first ferrite bead 104. The threaded flange 313 comprises an opening (not shown) that receives the cable 105. The threaded flange 313 is not rigidly affixed to the cable but can move upward and downward with respect to the cable 105. The threaded flange 313 has exterior threads that mate with threads (not shown) interior to the housing 201 (FIG. 2). As discussed further with respect to FIG. 5 below, the threaded flange 313 thus threadably mates with the bottom end of the housing 201.

A stopper 311 is rigidly affixed to the cable 105 between the distal end of cable 105 and the threaded flange 313. The stopper 311 prevents the threaded flange 313 from moving on the cable 105 when the threaded flange is threaded into the housing 201 (FIG. 2). Although the threaded flange 313 is spaced apart from the stopper 311 in FIG. 3, the threaded flange 313 rests against the stopper 311 when the threaded flange is screwed into the housing 201.

A flexible seal 312 is compressed between the threaded flange 313 and the stopper and forms a water-resistant seal. In the illustrated embodiment, the seal 312 is an O-ring.

Figure 4:
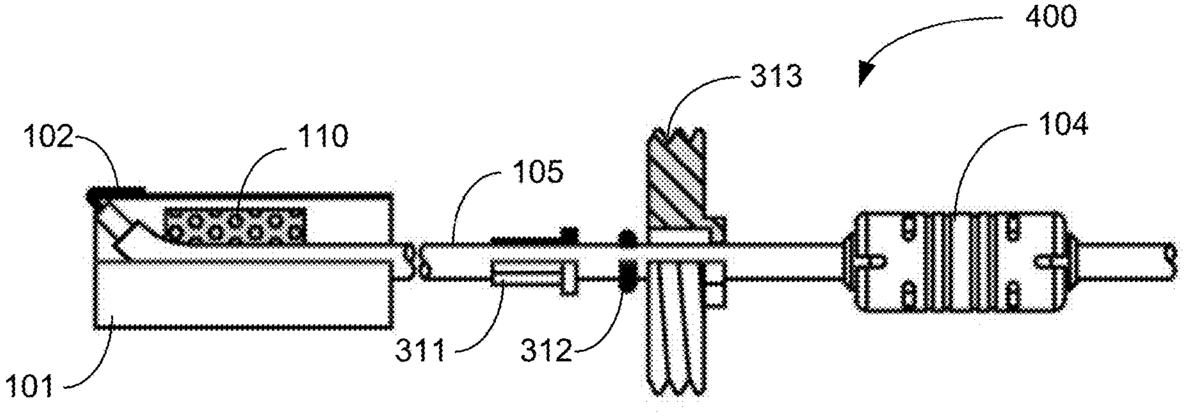
FIG. 4 is a partially cut-away view of a partial antenna assembly according to the embodiment of the present disclosure discussed above with respect to FIG. 1.

FIG. 4 is a partially cut-away view of a partial antenna assembly 400 according to the embodiment of the present disclosure discussed above with respect to FIG. 1. In this partial assembly 400, the conductive tube 101 has been added to the partial assembly 300 (FIG. 3). The center wire 102 of the cable 105 has been bent over the tube 101 and electrically connected to the tube 101. The centering spacer 110 fits within the tube 101 and serves to keep the cable 105 centered within the tube 101 for most of the length of the tube 101. In this regard, for generally at least 75% of the length of the tube, the cable 105 is centered within the tube before it is bent over to the tube wall. The centering spacer also serves to keep the tube 101, which is very thin-walled, mechanically stable. The centering spacer 110 has an opening to receive the cable 105. The outside diameter of the centering spacer 110 is slightly smaller than the inside diameter of the tube 101.

Figure 5:
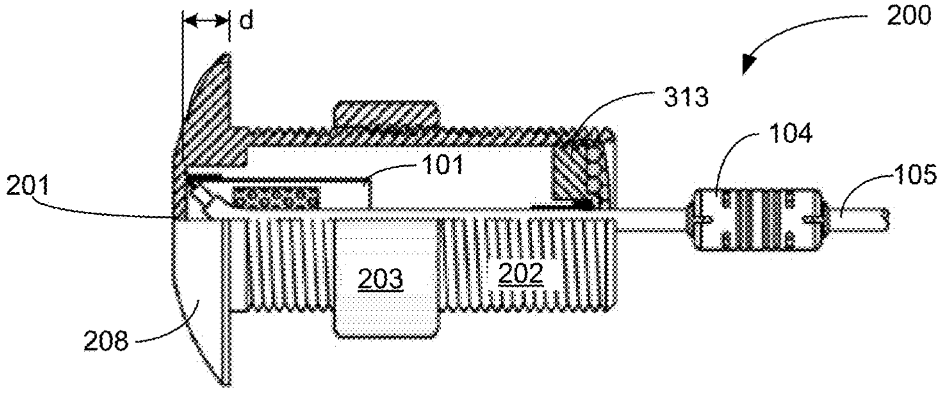
FIG. 5 is a partially cut-away view of the antenna of FIG. 2.

FIG. 5 is a partially cut-away view of the antenna 200 of FIG. 2. Importantly, the tube 101 extends above into the rounded top portion 208 a distance "d" as shown. This is important because the rounded top portion 208 is generally above ground when the antenna is in use, and the tube 101 generally needs to extend above ground in order for the antenna to transmit properly. In one embodiment, the distance "d" is between 0.40 and 0.49 inches.

The threaded flange 313 is engaged within the housing 202. In this regard, external threads on the threaded flange 313 mate with internal threads (not shown) within the threaded portion 202 of the housing 201.

Figure 6:
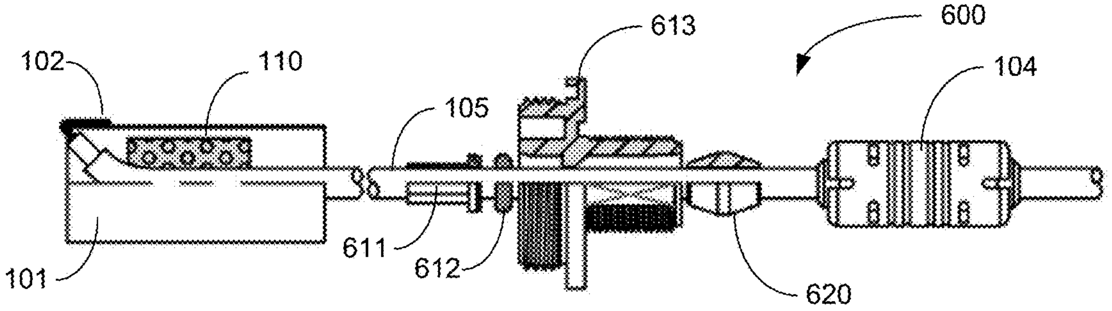
FIG. 6 is a partially cut-away view of a partial antenna assembly according to another embodiment of the present disclosure.

FIG. 6 is a partially cut-away view of a partial antenna assembly 600 according to another embodiment of the present disclosure. This embodiment may be used above the ground. In this embodiment the inner workings of the antenna are substantially identical to the antennas discussed herein, but the housing is configured differently. In this partial assembly 600, the centering spacer 110 has been installed on the coaxial cable 105. A threaded flange 613 is disposed on the cable 105 between the distal end of the cable 105 and the first ferrite bead 104. The threaded flange 613 comprises an opening (not shown) that receives the cable 105. The threaded flange 613 is not rigidly affixed to the cable but can move upward and downward with respect to the cable 105. The threaded flange 613 has exterior threads that mate with threads (not shown) interior to the housing, as further discussed below with respect to FIG. 7.

Figure 7:
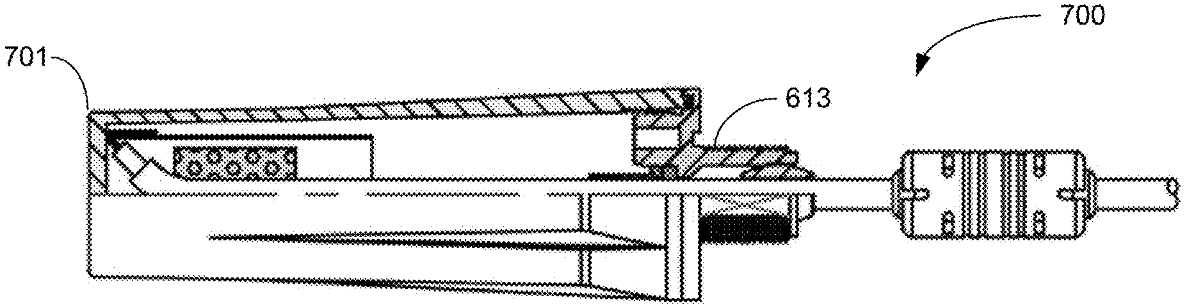
FIG. 7 is a partially cut-away view of an antenna according to another embodiment of the present disclosure.

A stopper 611 is rigidly affixed to the cable 105 between the distal end of cable 105 and the threaded flange 613. The stopper 611 prevents the threaded flange 613 from moving on the cable 105 when the threaded flange is threaded into the housing 701 (FIG. 7). Although the threaded flange 613 is spaced apart from the stopper 611 in FIG. 6, the threaded flange 613 rests against the stopper 611 when the threaded flange is screwed into the housing 701.

A flexible seal 612 is compressed between the threaded flange 613 and the stopper 611 and forms a water-resistant seal. In the illustrated embodiment, the seal 612 is an O-ring. In some embodiments, a tear-shaped flexible seal 620 is used to maintain a spacing of the cable 105 within the threaded portion of the threaded flange 613.

FIG. 7 is a partially cut-away view of an antenna 700 that may be used above the ground. A partial assembly of the antenna 700 was discussed above with respect to FIG. 6. The threaded flange 613 is engaged within the housing 701. In this regard, external threads on the threaded flange 613 mate with internal threads (not shown) within the housing 201. In some embodiments, the threaded flange 613 mates with mounting hardware (not specifically shown) when attaching the antenna—for example, the antenna 700 shown in FIG. 7—to a metal or composite cabinet or an 'L'-shaped metal bracket used for remote pole mounting.

Figure 8:
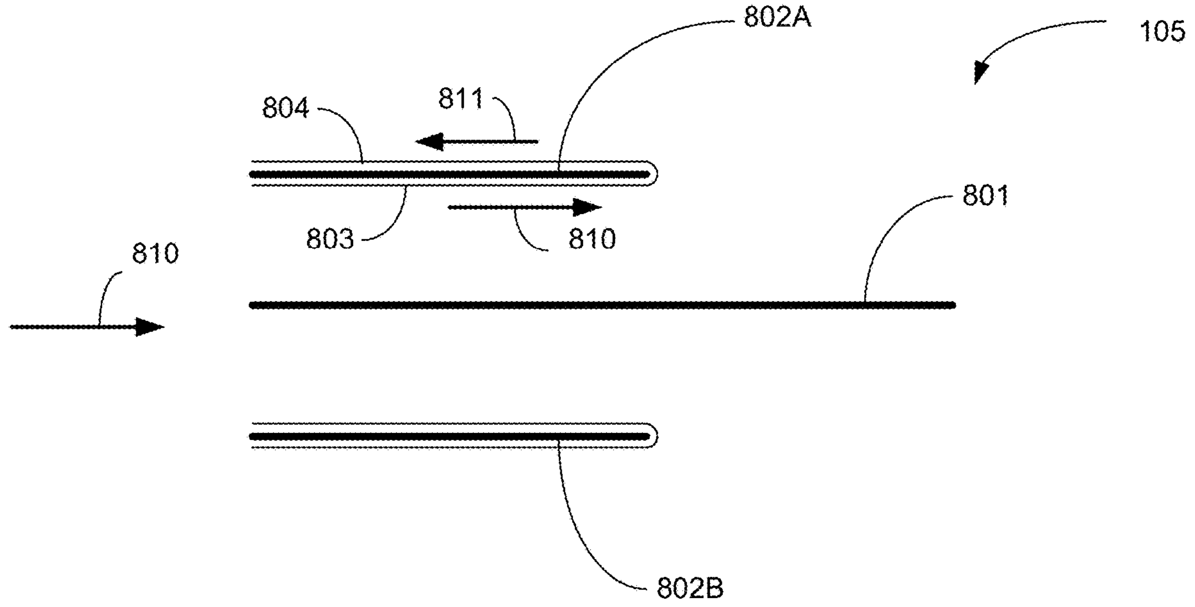
FIG. 8 is a representation of the distal end of the coaxial cable of an antenna.

FIG. 8 is a representation of the coaxial cable 105 of an antenna 100 as discussed herein with respect to FIG. 1. The antenna is a half wave end fed configuration at the lowest operating frequency and at all harmonics, such as would commonly referred to as a "non-resonant end fed antenna." The name derives from the fact that the feed line is actually part of the radiating element of the antenna after exiting the ferrite bead 104 (FIG. 1). The coaxial cable 105 is represented in rough cross section by three lines in FIG. 8: line 801 is the center conductor and lines 802A and 802B are the shield. Although coaxial cables are typically considered as having two conductors, at radio frequencies coax actually has three conductive surfaces: the center conductor 801; the inside surface 803 of the shield (braid) 802A; and the outside surface 804 of the shield 802A. The center conductor 801 of the coaxial cable and the inside surface 803 of the shield comprises the feed line and carries the signal in the direction indicated by directional arrow 810 along its length to the load (common mode currents). When the RF signal reaches the end of the coax, the currents on the center conductor 801 and the inside surface 803 of the shield cancel each other and substantially no radiation is generated. The application of the conductive tube 101 (FIG. 1) surrounding the cable 105 as discussed herein causes the RF energy to wrap around from the inside surface 803 of the shield and begin to flow on the outside surface 804 of the shield back toward the load, in the direction indicated by directional arrow 811. This current flowing on the outside of the shield does not cancel and begins to radiate.

In order for a half wave end fed configuration to perform properly at the lowest operating frequency and at all harmonics, the RF current must not travel back to the transceiver (not shown). Therefore the radiating shield current must be prevented from continuing down the feed line, while allowing the internal feed currents to continue unaffected. The ferrite beads 104 and 106 (FIG. 1) around the outer shield of the coaxial cable 105 limit the effect on the transceiver and the intended resonant point (resonant frequency) of the antenna. The limitations of the current create an end fed antenna.

The antenna broadband tuning is accomplished automatically by the addition of the tube 101 (FIG. 1) placed over and around the end of the radiating element with the center coax conductor 102 attached to the distal end 107 of the tube as described and shown herein. The antenna does not require a ground plane or the necessity for retuning, unlike many other antennas, and is vertically polarized.

When the operating frequency varies, the antenna resonance is automatically changed due to the reaction of the inductive and capacitive reactance maintained between the two over a broad bandwidth. As frequency decreases below resonance and the antenna becomes inductive, this tuning network offsets this reactive shift, thereby stabilizing voltage standing wave ratio (VSWR). Once the frequency increases above resonance and becomes capacitive, the same tuning network offsets this reactive shift, continuing to stabilize VSWR.

The antenna has a wide bandwidth an is suitable for cellular, IOT, Wi-Fi, and Bluetooth applications deployed in various environments.

What is claimed is:

1. A method for propagating signals with an automatically-tuning antenna, the method comprising:

providing a coaxial cable extending through the center of a conductive tube, a distal end of a center conductor of the coaxial cable electrically connected to a distal end of the conductive tube, a distal end of a shield of the coaxial cable not electrically connected to any conductor, the shield terminating within the conductive tube below the distal end of the conductive tube, the arrangement of the coaxial cable with the conductive tube creating an antenna;

arranging a first and a second ferrite bead on the coaxial cable outwardly from a proximal end of the conductive tube, outside of the conductive tube, the first and second ferrite bead disposed serially on the coaxial cable, spaced apart from one another;

applying an electrical signal to a proximal end of the coaxial cable;

automatically tuning the antenna as a frequency of the electrical signal changes.

2. The method of claim 1, wherein the step of automatically tuning the antenna as the frequency of the electrical signal changes comprises automatically changing the resonance of the antenna due to a reaction of inductive and capacitive reactance within the antenna, without reconfiguring physical components of the antenna.

3. The method of claim 1, wherein the step of providing a coaxial cable extending through the center of a conductive tube further comprises arranging a centering spacer between the conductive tube and the coaxial cable, the centering spacer configured to maintain the coaxial cable substantially centered within the conductive tube.

4. The method of claim 3, wherein the centering spacer is formed from an insulating material.

5. The method of claim 4, wherein the centering spacer is formed from polyurethane foam.

6. The method of claim 1, wherein the conductive tube is formed from brass, and wherein a wall of the tube is between 0.38 mm and 0.42 mm thick.

7. The method of claim 1, wherein the shield of the coaxial cable terminates within the conductive tube by a distance of between 6.1 mm and 6.6 mm from the distal end of the conductive tube.

8. The method of claim 1, wherein the first ferrite bead is spaced from a proximal end of the conductive tube by a distance of between 84.8 mm and 87.6 mm.

9. The method of claim 8, wherein the second ferrite is spaced apart from the first ferrite bead by a distance of between 59 mm and 61 mm.

10. The method of claim 1, wherein each of the first and second ferrite beads extends around the outer shield of the coaxial cable, and wherein the first and second ferrite beads are configured to affect a resonant point of the antenna.

11. The method of claim 1, further comprising installing a mushroom-shaped housing in a lid of an underground pit, the housing comprising a rounded top portion unitarily formed with a male-threaded portion, the male-threaded portion configured to pass through an opening in the lid, the rounded top portion configured to extend above the lid; wherein the conductive tube extends into the rounded top portion.

12. The method of claim 11, wherein the conductive tube extends into the rounded top portion by a distance of between 0.40 and 0.49 inches.

13. The method of claim 11, further comprising a female-threaded nut configured to mate with the male-threaded portion of the housing and secure the housing to the lid.

14. A method for propagating signals with an automatically tuning ultra-wideband antenna, the method comprising:

providing a conductive tube comprising a distal end and a proximal end;

arranging a coaxial cable through the center of the conductive tube, the coaxial cable comprising a center conductor and a shield, a distal end of the center conductor electrically connected to the distal end of the conductive tube, a distal end of a shield of the coaxial cable not electrically connected to any conductor, the shield terminating within the conductive tube below the distal end of the conductive tube, the arrangement of the coaxial cable with the conductive tube forming an antenna;

arranging a first and a second ferrite bead on the coaxial cable outwardly from the proximal end of the conductive tube, outside of the conductive tube, the first and second ferrite bead disposed serially on the coaxial cable, spaced apart from one another;

applying an electrical signal to a proximal end of the coaxial cable;

automatically tuning the antenna as a frequency of the electrical signal changes.

15. The method of claim 14, wherein the step of automatically tuning the antenna as the frequency of the electrical signal changes comprises automatically changing the resonance of the antenna due to a reaction of inductive and capacitive reactance within the antenna, without reconfiguring components of the antenna.

16. The method of claim 14, further comprising an insulating centering spacer disposed between the conductive tube and the coaxial cable, the centering spacer configured to maintain the coaxial cable substantially centered within the conductive tube.

17. The method of claim 14, further comprising a mushroom-shaped housing configured to be installed in a lid of an underground pit, the housing comprising a rounded top portion unitarily formed with a male-threaded portion, the male-threaded portion configured to pass through an opening in the lid, the rounded top portion configured to extend above the lid; wherein the conductive tube extends into the rounded top portion.

18. The method of claim 17, wherein the conductive tube extends into the rounded top portion by a distance of between 0.40 and 0.49 inches.

19. The method of claim 17, further comprising a female-threaded nut configured to mate with the male-threaded portion of the housing and secure the housing to the lid.

* * * * *